Patented Mar. 9, 1937

2,073,006

UNITED STATES PATENT OFFICE 2,073,006

METHOD OF PROCESSING ARTICHOKES

Herbert E. Gray and Arvid M. Erickson, San Jose, Calif.

No Drawing. Application April 20, 1935
Serial No. 17,488

2 Claims. (Cl. 99—186)

This invention relates to a method of processing artichokes.

Artichokes preparatory to canning contain or are contaminated by bacteria of one form or another. For this reason it is essential that they by subjected to a comparatively high temperature and pressure during the cooking or sterilizing operation to insure destruction of the bacteria. Artichokes because of their delicate structure, are detrimentally affected by high temperature and pressure; that is, the product becomes too soft and tends to break up and as such can not be cooked or sterilized by the above method.

Experiments have developed the fact that the presence of acid in artichokes inhibits the development of bacteria, hence this product which is so detrimentally effected by high temperature may be subjected to an acid treatment prior to cooking or sterilizing, and when so treated can be sterilized at a comparatively low temperature and pressure, thereby avoiding softening or breaking up of the product.

The acid treatment consists in placing the artichokes in raw, cold condition, after they have been peeled or otherwise prepared, in an acid solution; boiling them in this solution for a period of approximately six minutes, or so, to cause thorough saturation of the product with the acid solution and then removing the product from the solution and placing them in cans where they may be sealed and cooked or sterilized in the usual manner.

This method of acidifying artichokes is not altogether satisfactory, first because some of the flavor of the artichokes is boiled out or lost during the acidifying operation. Acid is lost and it is also more or less essential to cool the product before placing it in the cans as many products are hand packed, thereby losing time.

The present invention relates to an improved method of acidifying artichokes whereby heating in an acid solution is eliminated; a quicker and more thorough saturation of the product with acid is obtained; the cooling step is eliminated and acid is saved. The method is accomplished as follows: The artichokes, after proper preparation, for instance peeling, coring, or whatever it may be, are placed in a container containing an acid solution. The container is closed and a vacuum of approximately twenty-nine inches is applied for a period of one-half minute or so. During the vacuum treatment the acid solution enters the cell structure of the product and thoroughly saturates the same. Thereafter the vacuum is released, the product is removed and may immediately be placed in cans which may then be sealed, cooked or sterilized in the usual manner.

The acid solution employed may vary. In the treatment of the edible part of artichokes, a one per cent solution of citric acid is employed. The solution is maintained at room temperature or substantially so, and cooling of the product after removal from the acid solution is thereby eliminated and any loss of acid by such treatment is obviated.

The most important advantages obtained by this process are the retention of all flavor, as the product is not subjected to a cooking operation; the time required is reduced to a minimum as one-half minute under vacuum is usually sufficient. Artichokes saturated with an acid solution by this method need only be sterilized at a temperature of approximately 212° or slightly above the same, as this is sufficient to destroy any bacteria present and as the product is saturated with acid any further growth or development is inhibited.

The low sterilizing temperature employed prevents softening and breaking up of the product and its commercial value is accordingly increased. The method of applying the acid solution has been particularly used in connection with artichoke products, such as artichoke hearts, bottoms, and the like. While certain features of the invention are more or less specifically described, we wish it understood that various changes may be resorted to within the scope of the appended claims. Similarly, that the materials and finish of the several parts employed may be such as the manufacturer may decide, or varying conditions or uses may demand.

Having thus described our invention, what we claim and desire to secure by Letters Patent is:—

1. A method of canning artichokes comprising preparing the edible portion of the fresh artichoke, submerging the prepared pieces in a solution of acid while in cold, raw condition, applying a substantial vacuum to the solution and its contents, holding the vacuum for a brief period of time, releasing the vacuum, thereby causing thorough penetration of the acid solution through the artichokes, removing the pieces from the surrounding solution, sealing them in cans, and subjecting the sealed cans to a sterilizing step at approximately 212° F.

2. A method of canning artichokes comprising preparing the edible portion of the fresh artichoke, submerging the prepared pieces in a solution of citric acid while in cold, raw condition, applying a substantial vacuum to the solution and its contents, holding the vacuum for a brief period of time, releasing the vacuum, thereby causing thorough penetration of the acid solution through the artichokes, removing the pieces from the surrounding solution, sealing them in cans, and subjecting the sealed cans to a sterilizing step at approximately 212° F.

HERBERT E. GRAY.
ARVID M. ERICKSON.